United States Patent [19]
Reid

[11] Patent Number: 5,622,088
[45] Date of Patent: Apr. 22, 1997

[54] AUTOMATIC TRANSMISSION FOR RACING VEHICLE

[76] Inventor: Dennis Reid, 107 Rodeo Ct., Lafayette, Calif. 94523

[21] Appl. No.: 311,819

[22] Filed: Sep. 26, 1994

[51] Int. Cl.$^6$ ..................................... F16H 57/02
[52] U.S. Cl. .................. 74/606 R; 192/85 AA; 475/116
[58] Field of Search .............. 192/109 F, 85 AA; 74/606 R; 475/116; 60/435, 436, 439

[56] References Cited

U.S. PATENT DOCUMENTS

| | | |
|---|---|---|
| 2,775,905 | 1/1957 | Jackson . |
| 3,370,682 | 2/1968 | McFarland ............ 192/85 AA |
| 3,455,409 | 7/1969 | Clark . |
| 3,669,234 | 6/1972 | Mathers ............... 192/109 F |
| 3,696,689 | 10/1972 | Senter et al. . |
| 3,724,626 | 4/1973 | Clauss, Jr. et al. ........... 192/109 F |
| 4,446,759 | 5/1984 | McCrary . |
| 4,724,727 | 2/1988 | Shibayama et al. . |
| 4,971,185 | 11/1990 | Hayakawa et al. . |
| 5,090,528 | 2/1992 | Massel . |
| 5,098,354 | 3/1992 | Kuwayama et al. . |
| 5,184,524 | 2/1993 | Senia . |
| 5,193,415 | 3/1993 | Massel . |
| 5,195,400 | 3/1993 | Hayakawa et al. . |

Primary Examiner—Richard M. Lorence
Assistant Examiner—Mary Ann Battista
Attorney, Agent, or Firm—Limbach & Limbach L.L.P.

[57] ABSTRACT

An improved automatic transmission has a reverse gear piston which can be engaged as a transmission brake. The piston is movable in a first direction and has a surface. A hydraulic supplies transmission fluid to a space between the surface and the housing to engage the piston and removes the hydraulic fluid from the space to disengage the piston thereby releasing the transmission brake. In one embodiment, the hydraulic has a passageway with the first cross-sectional area through the housing and a second cross-sectional area larger than the first cross-sectional area in the housing that is exposed to the space thereby reducing friction between the fluid and the second cross-section which reduces the release time of the fluid from the space. In another embodiment, the transmission can adjust the cross-sectional area of the passageway through the housing. In another embodiment, a mechanism for bleeding air from the fluid in either the space or the passageway is added to reduce air compression/decompression problems. In yet another embodiment, an explosion proof bellhousing around the flexplate area protects the engine, transmission, passenger compartment, and roadway from flying debris in case of a failing flexplate.

21 Claims, 9 Drawing Sheets

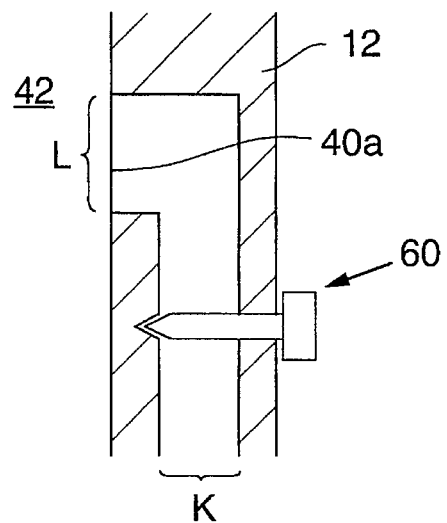
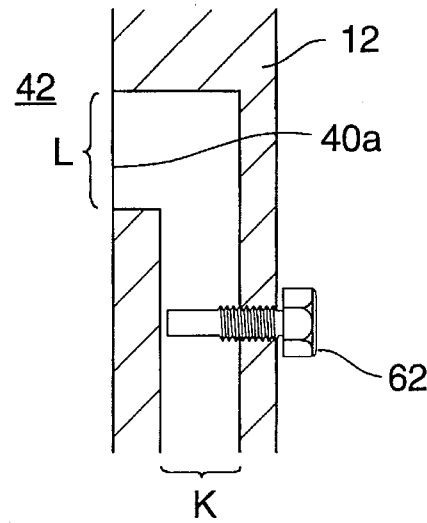
FIG. 5A     FIG. 5B
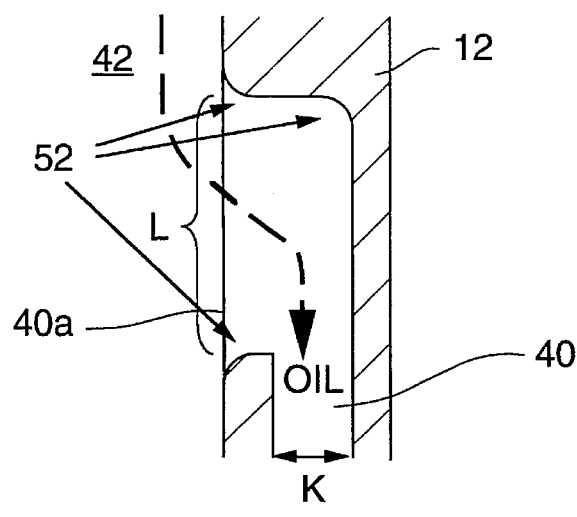
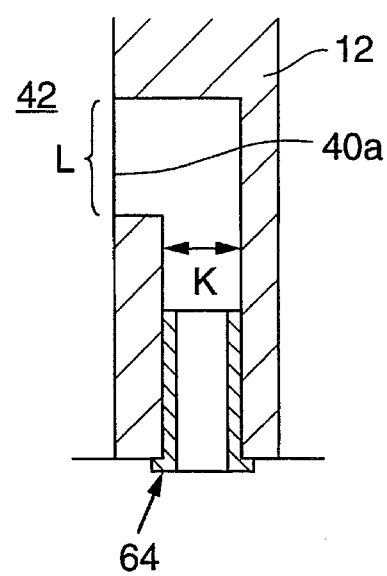
FIG. 4     FIG. 5C

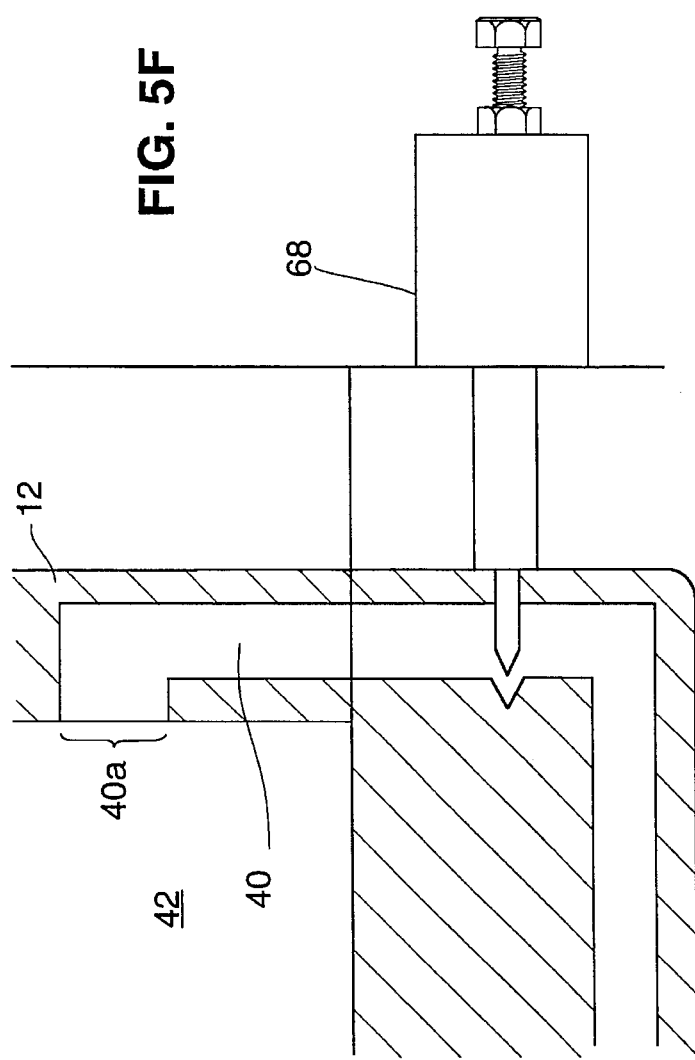
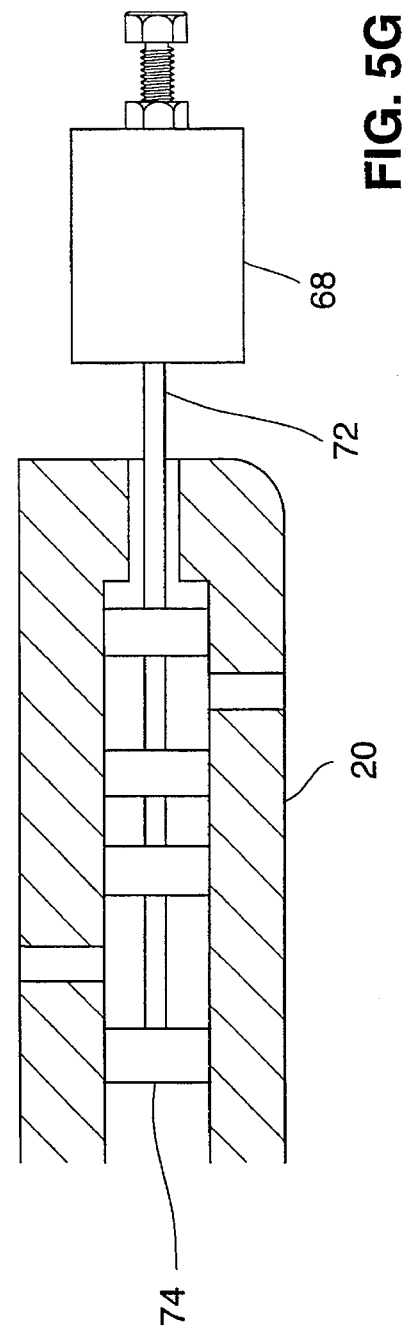

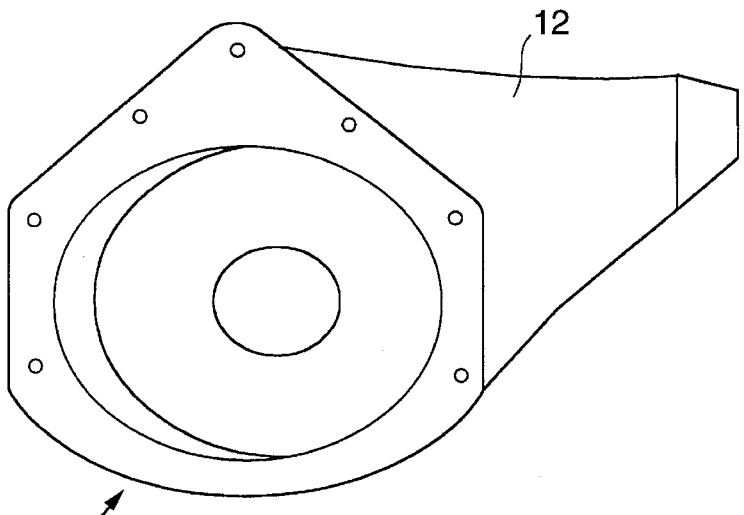
FIG. 10
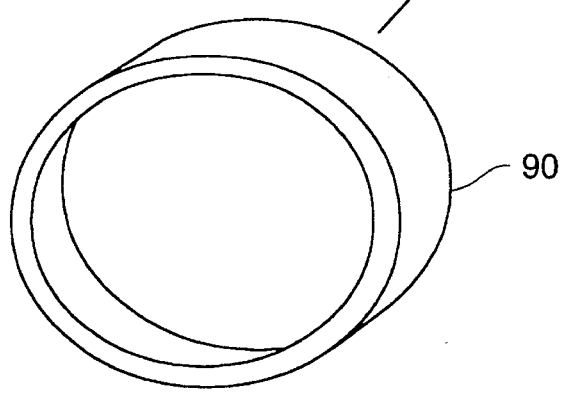
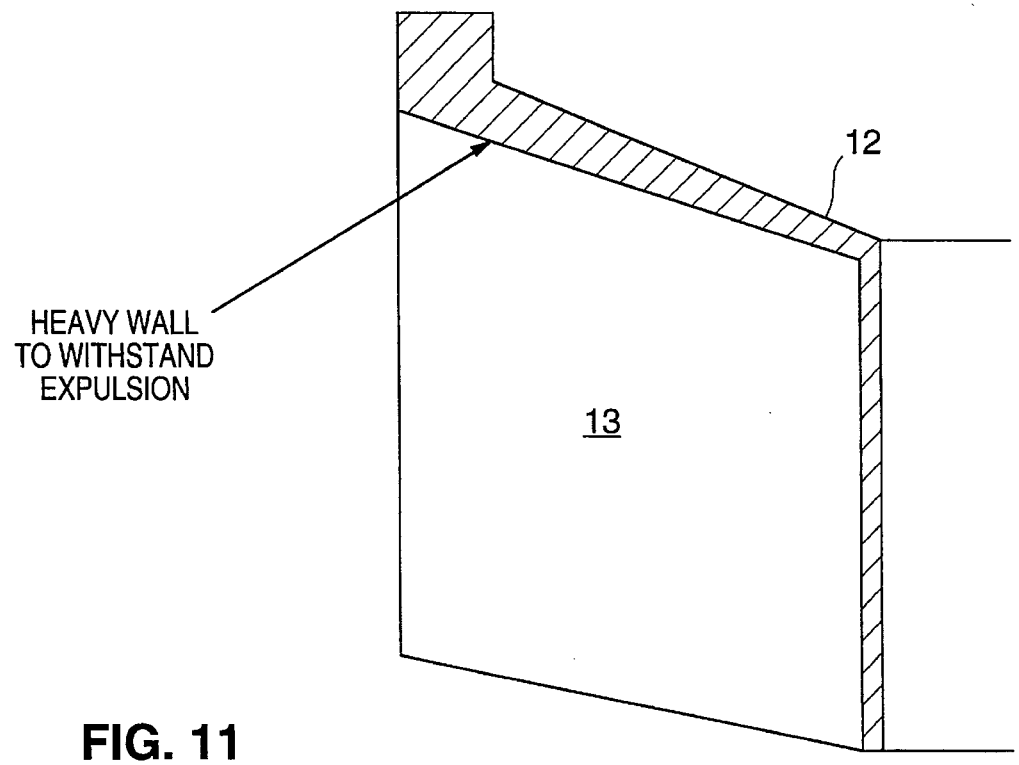
HEAVY WALL TO WITHSTAND EXPULSION
FIG. 11

AUTOMATIC TRANSMISSION FOR RACING VEHICLE

TECHNICAL FIELD

The present invention relates to an automatic transmission for a racing vehicle, and more particularly, to an automatic transmission having increased acceleration.

BACKGROUND OF THE INVENTION

Automatic transmissions manufactured for conventional automobiles are not well suited for racing vehicles. A number of problems, including the components being subjected to a higher rotational speeds as well as being subjected to higher stress, arise when automatic transmissions manufactured for conventional automobiles are used in racing vehicles. This can cause breakage of a large rotating component into fragments that can cause breakage of other parts of the transmission. A number of prior art patents, including U.S. Pat. Nos. 5,193,415 and 5,090,528, disclose solutions to this problem.

One of the component parts of an automatic transmission is a part called the valve body. The valve body consists of passageways and valves that shuttle oil (automatic transmission fluid) around to various sections of the transmission. When the oil is commanded by the valve body to go to a certain section of the transmission, that section of the transmission performs its intended function. The functions could include to shift up, down, softly, reverse, etc. The valve body gets its input from a variety of sources which are typically the driver through the shift lever, the engine speed, the load and transmission oil temperature. The valve body is designed or programmed to control the transmission according to a set of rules which relate to all of the inputs together.

One of the commands that the valve body issues is how hard the transmission should shift gears. This is done by including in the valve body a spool valve that is moved by a vacuum canister (also called a "vacuum modulator") that is attached to the outside of the transmission case. The vacuum canister reacts to the amount of vacuum present in the intake manifold of the engine. At light loads, there is a high vacuum present. At heavy loads, i.e. full throttle, there is very little vacuum present.

At heavy loads, it is desirable to make gear shifts as quickly and abruptly as possible. This maintains the maximum amount of power flowing through the drive train and it prevents the destructive slipping of the clutches which might occur due to the heavy loads during a shift. At light loads, the vacuum modulator moves the spool valve in the opposite direction which tells the transmission to make a soft or lazy shift. The power going to the transmission is low so that clutch slippage is minimal. The purpose of the soft shift is to prevent an uncomfortable "bone jarring" gear change from occurring at light loads.

In drag racing, all shifts are made at full power and the quickest shift possible is desired so that a modulator circuit is not required. The modulator circuit is not wasted, however, because the transmission is modified by adding a transmission "brake". This brake usually consists of a valve body that has had its internal oil passageways changed (specifically the modulator circuits). The vacuum modulator canister that was attached to the outside of the transmission case is replaced with an electric solenoid. The solenoid pushes on the former modulator spool valve. Instead of sending oil to tell the transmission how hard to shift, the modulator spool valve sends oil to the reverse gear apply piston. When the oil is directed to this piston, it moves and locks up the reverse gear clutch which applies reverse gear.

With the reverse gear applied, the transmission is placed in a low forward gear as well. Thus, the transmission is jammed because it is in reverse and forward gear at the same time, effectively creating a transmission "brake". The engine can run at full throttle and the car won't move because of the jammed transmission.

During drag racing, two cars line up side by side on the starting line. After a countdown, typically accomplished by a Christmas tree sequentially counting down a series of lights, the driver releases an electrical switch that supplies power to the transmission brake solenoid, which has replaced the vacuum modulator canister, resulting in the release of the reverse gear. Since the car is also in low gear, the full power of the energy is instantly applied to the rear wheels of the car resulting in maximum acceleration.

For absolute maximum acceleration with existing transmissions, release of the rear gear must be made as quickly as possible. This is desirable to "shock" the rear tires and suspension to make the tires adhere to the pavement instead of spinning. In addition, it is desirable to minimize the amount of reaction time for the car to start moving from the time the electrical signal is removed from the transmission brake solenoid. This permits the racing vehicle to have a quicker start time.

Typical conventional automatic transmissions have passageways that feed oil through the housing and into the piston of the reverse gear. This feed oil passageway supplies the oil to the reverse gear piston which locks up the reverse gear clutches and applies reverse gear. At the same time, this passageway must be the passageway through which the oil is released, flowing in an opposite direction to release the reverse gear. In the prior art, in an effort to speed up the oil flow out of the piston area when the transmission brake is released, racers have drilled out the feed passageway to increase the size of the passageway. Although the larger passageway allows oil to flow faster out of the area, there is a trade off because the larger passageway increases the total amount of oil in the reverse gear apply system. That is, when the gear is first applied, more oil must flow into the reverse gear apply system to fill the enlarged passageway. Therefore, more volume must consequently be removed from the reverse gear apply system when the reverse gear is released. Thus, this trade off limits the amount of improvement possible in decreasing the starting time of a racing vehicle. There is a need to speed the oil flow out of the piston area without drastically increasing the amount of oil in the reverse gear apply system.

By designing a new transmission case, it is possible to create more efficient fluid passageways that release the transmission "brake" extremely quickly. For some car designs, however, a "brake" release that is too fast causes the tires to be "shocked" too hard, resulting a loss of traction (a common condition in stick shift racing cars). An adjustable means to slow down the release of the transmission "brake" is needed to make the transmission compatible with different racing vehicles.

Another problem hindering the speed of release of the transmission brake is the amount of air present in the reverse gear apply piston area. Under racing conditions, air is always present in the oil because of foaming. Foaming occurs when oil is churned up by the rotating parts while in the presence of air. A quick decrease of the volume of oil in a confined reservoir without air present results in a quick decrease of pressure in the confined reservoir. If air is present, the air expands thus slowing the quick decrease of pressure, which in turn slows the release of the transmission brake. Further, since the amount of air in the system is never the same, the release times of the transmission brake will vary. There is a need to bleed the air consistently in such a system as successful drag racing today requires that a vehicle repeat within thousandths of a second.

Existing racing transmissions sometimes have a hole drilled in the backside of the reverse gear apply piston to bleed air out. This solution has three drawbacks. First, the piston must be installed with the hole on the top and it must not be allowed to rotate with time (since the air will always rise to the top-above the fluid). Second, the hole is on the clutch disc side of the piston where dirty, unfiltered oil is present. This can allow chunks of debris or clutch dust to plug the hole, and it allows dirty oil into the pressure side of the piston causing permanent scoring of the seal area and damage to the piston seals. Finally, the clutch plates contact the outer diameter face of the piston. In order to prevent the clutch plates from blocking the bleed hole, the hole must be drilled near the center of the piston, thereby leaving a large air pocket at the top portion of the piston.

Another problem with such a transmission is that under racing conditions, the engine flex plate sometimes fails and shatters, sending flying debris out of the transmission/flywheel area similar to an explosion. The racing sanctioning bodies have mandated the use of "explosion proof" flexplates. For extra safety, "explosion shields" are also mandated that attach to the transmission in the flywheel area to prevent parts from flying up through the floorboards of a car. There are currently no requirements to prevent debris from exiting the bottom of the transmission/flywheel area. The existing shields are straps of steel or composite materials that bolt to the top of the transmissions in the flexplate area. The existing production transmissions are not designed for, nor are adequate to act as explosion shields. During an explosion, the entire bellhousing (the flexplate area of the transmission housing) shatters and is destroyed. There is a need for a shielding means to protect the bellhousing, engine compartment, car interior, and roadway from flying debris in the case of a flex plate failure.

One current solution is to separately cast the bellhousing so that it is strong enough to resist flexplate explosions. The drawback to this solution is that the entire front of the transmission must be cut off and machined to accept the separately cast bellhousing unit. There is a need for a convenient and lightweight flexplate shield.

SUMMARY OF THE INVENTION

The foregoing problems are addressed by the present invention. The present invention includes an improved transmission housing comprising a reverse gear piston in the housing which is movable in a first direction and having a surface. There is a hydraulic means for supplying hydraulic fluid to a space between the surface and the housing to engage the piston as well as removing the hydraulic fluid from the space to disengage the piston.

The hydraulic means includes a passageway having a cross-sectional area that is smaller than the cross-sectional area of the passageway opening into the space. The opening can be either circular, elliptical, or in the form of a slit. The opening can have rounded surfaces where it meets the space to reduce turbulence in the hydraulic fluid.

The transmission can also include an adjusting means, such as a needle valve, blocking bolt, restricting sleeve, etc., for adjusting the cross-sectional area of the passageway. This would adjust the release time of the transmission.

The transmission can also include a bleed valve for removing any air in the hydraulic fluid. The bleed valve can be in either the passageway or the space. The bleed valve continually purges the air contained in the foamed oil from the transmission brake circuit.

Finally, the transmission can also include a flex plate shield that protects the passenger compartment, engine compartment, the transmission housing, and the roadway from exploding parts. The shield can be formed by a one or two piece explosion resistant liner insertable in the automatic transmission between the external housing and the internal components. Alternatively it can be formed integrally with the transmission housing, with an attachable piece to complete the circumferential flex plate shield.

BRIEF DESCRIPTION OF THE DRAWINGS

FIG. 4 is an enlarged cross-sectional view of a portion of the passageway for removing oil from the reverse piston gear portion of the improved automatic transmission of the present invention.

FIG. 10 is a perspective view of another embodiment of the automatic transmission of the present invention with a liner completely lining the transmission housing to prevent explosion.

FIG. 11 is a cross-sectional view of the flexplate portion of the automatic transmission housing having strengthened sidewalls to withstand explosion.

DETAILED DESCRIPTION OF THE DRAWINGS

Figure 1:
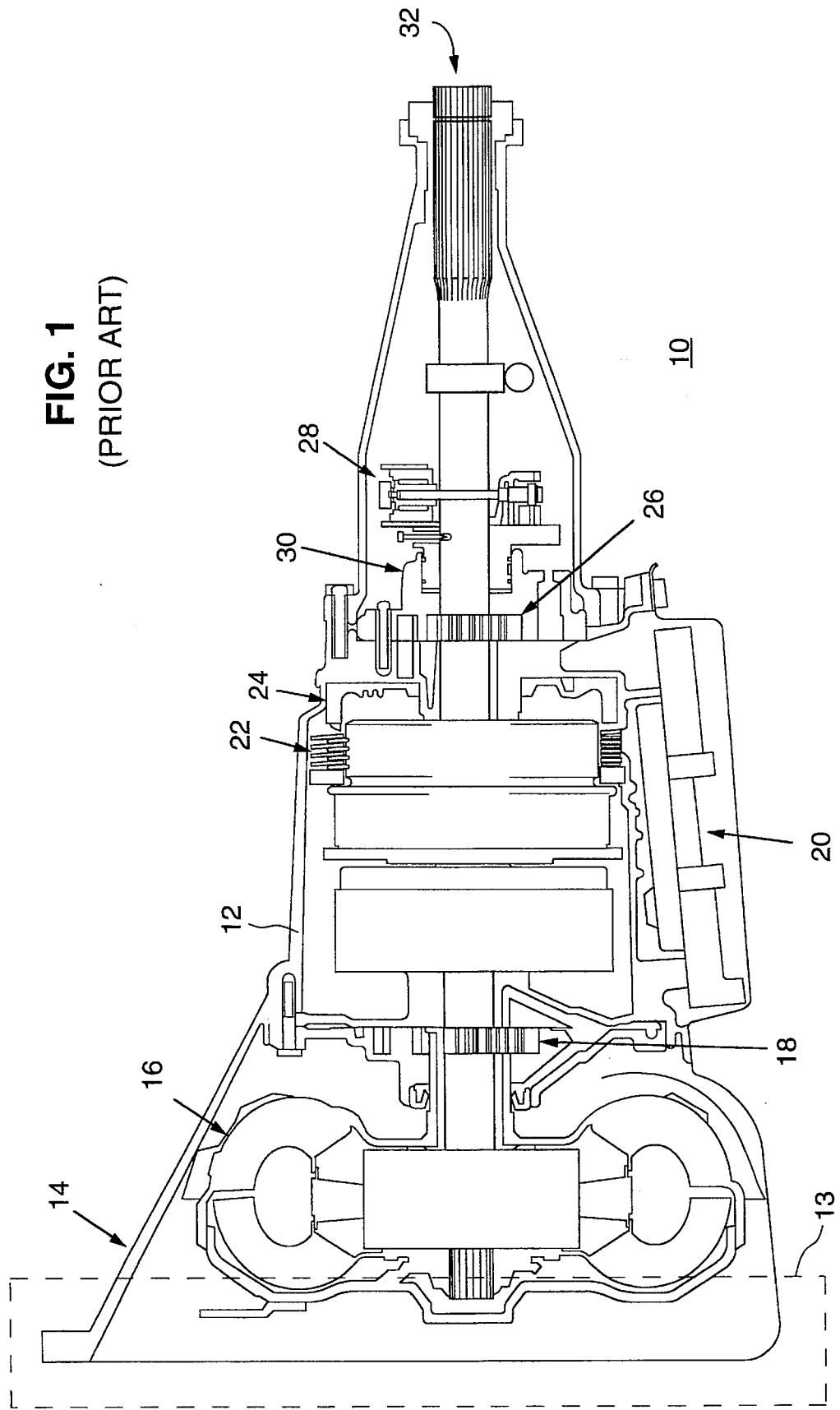
FIG. 1 is a cross-sectional view of an automatic transmission and its various components.

Referring to FIG. 1 there is shown a cross-sectional view of an automatic transmission 10. The automatic transmission 10 comprises a housing 12. A portion of the transmission housing 12 contains flexplate area 13 and the bellhousing portion 14. Within the bellhousing 14 is a torque converter 16. In addition, a front oil pump 18 is adjacent to the torque converter 16. The transmission 10 also comprises a valve body 20 and a reverse clutch assembly 22 and a reverse apply piston 24. Finally, as described heretofore, the automatic transmission 10 has a rear oil pump 26, a governor 28 and a governor housing 30. An output shaft 32 is directly coupled to the wheels (not shown).

As previously discussed, for drag racing, to achieve maximum acceleration, the reverse piston 24 is engaged thereby "jamming" the automatic transmission 10 in both the forward gear as well as the reverse gear. When it is desired to accelerate the racing vehicle, the reverse piston 24 is disengaged thereby disengaging the reverse gear. With the forward gear still engaged, maximum throttle or torque would then be supplied to the wheels.

Figure 2A:
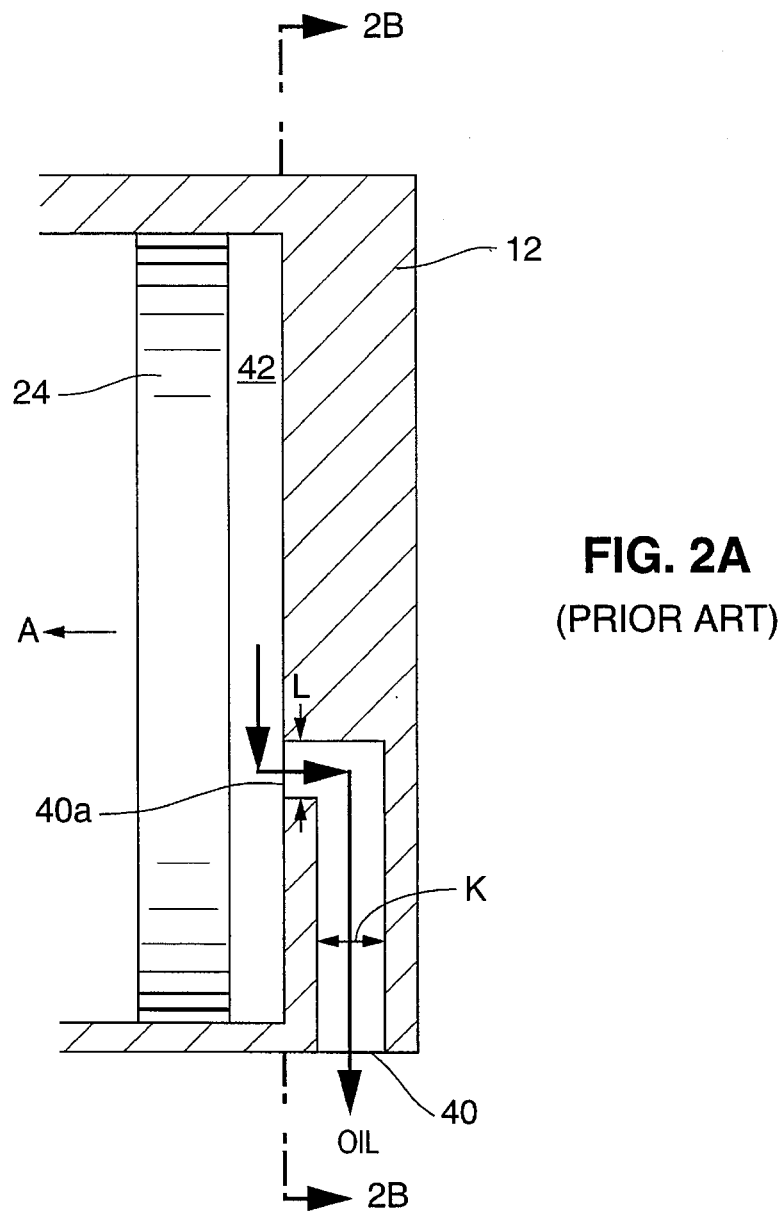
FIGS. 2(A and B) are cross-sectional views of the reverse piston gear portion of an automatic transmission of the prior art.
Figure 2B:
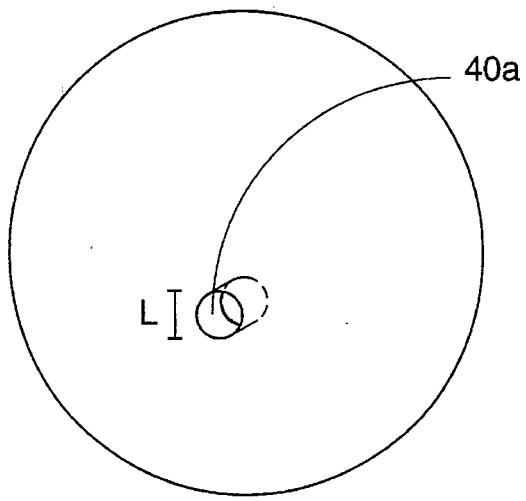

Referring to FIGS. 2A and 2B, there is shown cross-sectional views of the reverse piston 24 portion of a conventional automatic transmission 10 of the prior art. The reverse piston 24 moves in the direction shown by the arrow A to apply the reverse gear. Transmission fluid, such as oil, is fed through a passageway 40 in the housing 12 and through hole 40a into a space 42 between the piston 24 and the housing 12. When oil is supplied to the space 42, it pushes the piston 24 in the direction shown by the arrow A thereby engaging the reverse gear (and therefore the transmission brake). This then permits the racer to throttle up the engine without any movement of the car. To obtain maximum acceleration, the oil (transmission fluid) in the space 42 must be drained from that region out hole 40a and through the passageway 40 as quickly as possible thereby moving the piston 24 in a direction opposite to the direction shown by the arrow A. In the prior art, the passageway 40 has a varying shape and cross-sectional area K supplying oil through the housing 12 and into the space 42 through hole 40a having a cross-section area L. Hence, as shown in FIG. 2B, the passageway 40 ends at area 42 with a small circular hole 40a having cross-section area L.

As previously discussed, in the prior art, in an attempt to increase the flow rate of the transmission fluid from the space 42, users have increased the cross-sectional areas K and L of the passageway 40 and hole 40a by drilling a round hole of larger cross-sectional area. However, with a larger cross-sectional area K and L, a larger volume of transmission fluid is required to fill both the space 42, the enlarged passageway 40, and the enlarged hole 40a. Thus, although the rate at which the transmission fluid may be drained from the space 42 is increased, because there is a larger volume of the transmission fluid, performance gain is limited.

Figure 3A:
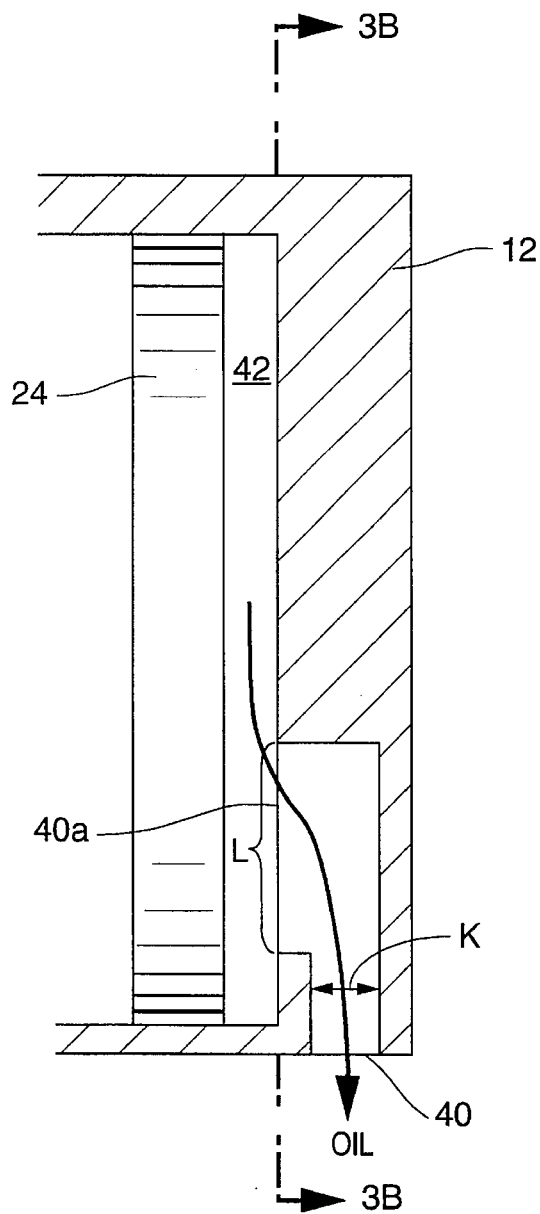
FIGS. 3(A and B) are cross-sectional views of the reverse piston gear portion of the improved automatic transmission of the present invention.
Figure 3B:
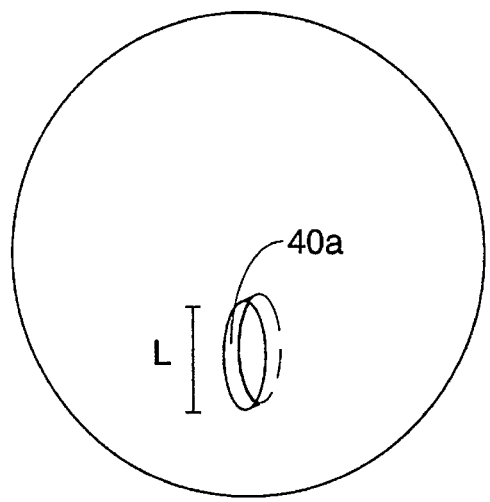

In the present invention, performance is increased, i.e. acceleration is increased, by maintaining the same or smaller cross-sectional area K for the passageway 40 as shown in FIG. 2A, but increasing the cross-sectional area L of the hole 40a terminating or exposing to the space 42. Referring to FIGS. 3A and 3B, there is shown cross-sectional and isometric views respectively of the portion of the housing 12 near the reverse gear 24. In the improved automatic transmission 10 of the present invention, the cross-sectional area L of the hole 40a is increased. In one embodiment, as shown in FIG. 3B, the cross-sectional area L is increased by creating an elongated slot. With the cross-sectional area K of the passageway 40 through the housing 12 the same or less than the cross-sectional area L of hole 40a, the amount of transmission fluid supplied to the space 42, to engage the rear piston 24 remains essentially the same as the prior art (since the added volume of fluid to fill enlarged hole 40a is negligible). However, to disengage the rear piston 24, the transmission fluid from the space 42 can be removed at a faster rate because of the larger cross-sectional area L of hole 40a. This is so because the "choke" point of this hydraulic fluid system is the circumferential area of space 42, which is that volume of space 42 immediately between hole 40a and piston 24. Thus, by increasing the cross-sectional area L, and thereby increasing the choke point (circumferential area in space 42), without appreciably increasing the volume of oil in the system, the amount of time it takes to drain the transmission fluid from the space 42 is decreased thereby reducing the reaction time of the racing vehicle upon the initiation of a start action.

Referring to FIG. 4, another embodiment of the present invention is shown, where the passageway 40 portion of the housing 12 has curved surfaces. Without curved surfaces, fluid leaving the space 42 would require traversing two 90° paths. The fluid in the space 42 would traverse a first 90° path by moving in a direction opposite the arrow A into the housing 12. The fluid would then traverse a second 90° path by changing to a downward direction. The two 90° turns can cause turbulence as the fluid is drained from the space 42. This turbulence is worse for holes 40a having a circular shape as opposed to an elliptical or slot shape. In the embodiment of the present invention that is illustrated in FIG. 4, the passageway 40 has curved surfaces such that turbulence of the transmission fluid passing through hole 40a and into passageway 40 in the housing 12 is reduced, thereby reducing friction that could impede the flow of the oil.

The embodiment of the present invention shown in FIG. 3A shows the cross-sectional area having a fixed enlarged area L exposed to the space 42 compared to the smaller cross-sectional area K within the housing 12.

Referring to FIGS. 5(A–G) there is shown various embodiments of the present invention wherein the "effective" cross-sectional area of passageway 40 in the housing 12 may be varied relative to the cross-sectional area L exposed to the space 42. As used herein, including as used in the claims, and as shown in FIGS. 5(F) and 5(G), the passageway 40 in the housing 12 includes a passageway 40 in the valve body 20.

In FIG. 5A, the cross-sectional area K of the passageway 40 within the housing 12 is the same as the cross-sectional area L of the hole 40a. However, a needle valve 60 is positioned in the passageway 40. The needle valve 60 can be moved thereby adjusting the "effective" cross-sectional area of the passageway 40 in the housing 12. With the "effective" cross-sectional area of passageway 40 reduced by needle valve 60, the cross-sectional area L of hole 40a is larger compared to the "effective" cross-sectional area of passageway 40. It should be noted that the size of the cross-sectional areas L and K in the drawings are not drawn to scale. Further, although in the preferred embodiment the cross-sectional area of L is larger than the cross sectional area of K, it is not critical to the invention. In the event the cross sectional area of L is less than or equal to the cross sectional area of K, then the shape of the passageway 40, with curved edges, as shown in FIG. 4 becomes important, for fluid flow.

Referring to FIG. 5B there is shown a blocking bolt 62 positioned in the passageway 40. In this embodiment, although the cross-sectional area L exposed to the spacing 42 has been enlarged compared to the cross-sectional area K within the housing 12, the blocking bolt 62 permits adjustment of the "effective" cross-sectional area within the passageway 40 in the housing 12.

Referring to FIG. 5C there is shown another embodiment of an adjusting means for adjusting the "effective" cross-sectional area of the passageway 40. A sleeve 64 having a reduced cross-sectional area is positioned along the passageway 40 thereby reducing the "effective" cross-sectional area of passageway 40.

Figure 5D:
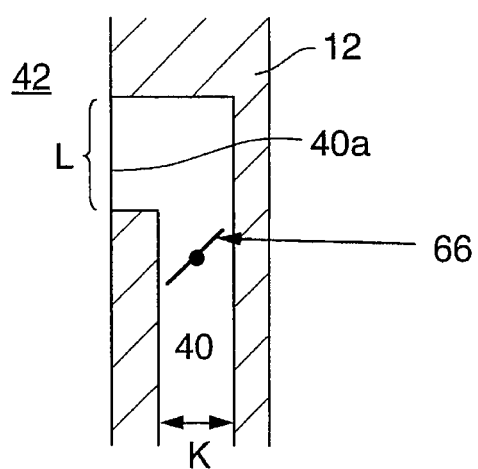
FIGS. 5(A–G) are cross-sectional views of other embodiments of the passageway portion of the automatic transmission housing showing means for adjusting the cross-sectional area flow of the oil from the reverse piston gear portion.

Referring to FIG. 5D there is shown another embodiment of the adjusting means for adjusting the "effective" cross-sectional area of the passageway 40 in the housing 12. A butterfly valve 66 is positioned in the passageway 40 and may be rotated so as to reduce the "effective" cross-sectional area of the passageway 40.

Figure 5E:
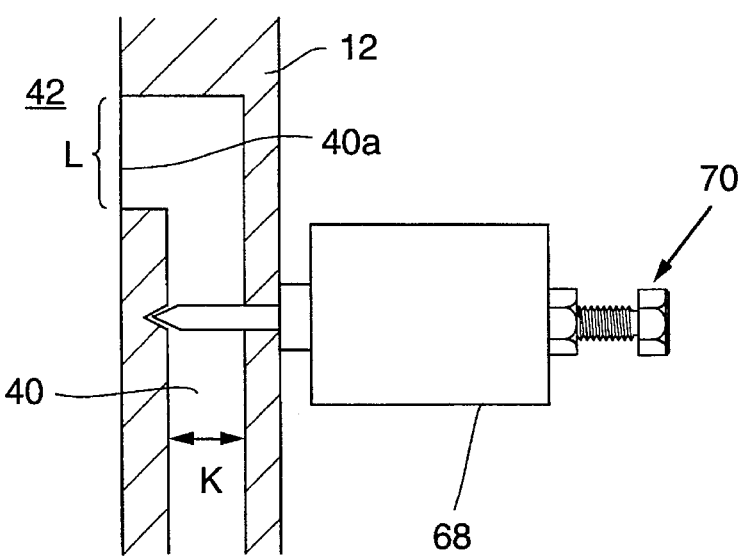

Referring to FIG. 5E there is shown another embodiment of the means to adjust the "effective" cross-sectional area of passageway 40. A solenoid 68 with an adjustable plunger stop bolt 70 attached thereto is positioned along the passageway 40. The degree to which the plunger stop bolt 70 can be inserted into passageway 40 can be adjusted. The solenoid 68 can be activated to either restrict the flow of transmission fluid through the passageway 40 or to permit the transmission fluid to flow therethrough unimpeded.

Referring to FIG. 5F there is shown another embodiment of the adjusting means for adjusting the "effective" cross-sectional area of the passageway 40. A solenoid 68 activates a bolt which is positioned along the passageway 40. The blocking bolt or needle valve is in the valve body 20 which bolts to the transmission case, as opposed to the blocking bolt or needle valve illustrated in FIG. 5E, which is inside the transmission case itself.

Referring to FIG. 5G, there is shown yet another embodiment of the adjusting means 68 to adjust the "effective" cross-sectional area of passageway 40. A solenoid 68 has an adjustable rod 72 attached thereto. The rod 72 is connected to a spool valve 74 at its other end. Spool valve 74 can either be the existing modulator spool valve or a new one to replace the existing valve. When the solenoid 68 is activated, urging the adjustable rod 72, the rod 72 pushes against the spool valve 74 to open the valve. This would allow flow of the transmission fluid through the passageway 40 to pressurize the reverse gear piston. Activating the solenoid 68 in the opposite direction would release pressure in the reverse gear. Changing the stroke of the spool valve would adjust the oil flow rate out of the reverse piston area 42.

Figure 6:
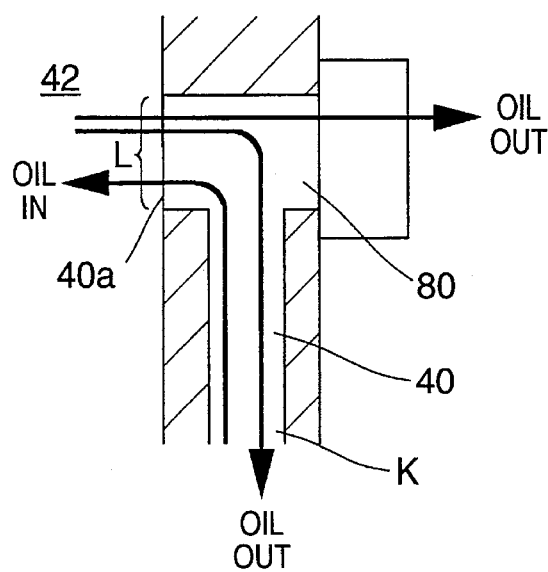
FIG. 6 is a cross-sectional view of another embodiment of the improved automatic transmission of the present invention with a rear gear piston bleed valve or bypass valve.

Referring to FIG. 6 there is shown a cross-sectional view of another improvement to the automatic transmission 10 of the present invention. In addition to the passageway 40 supplying transmission fluid to and from the space 42, a second passageway 80 provides a bypass passageway. The bypass passageway 80 can be used to bleed air from the space 42 or may be used to accelerate the removal of the transmission fluid from the space 42. Removal of air from the transmission fluid prevents compression and decompression of air that could increase the time it takes to remove the fluid from space 42 to disengage reverse gear. Further, since different amounts of air won't be trapped in the fluid, the response time of transmission 10 will be more consistent.

Figure 7C:
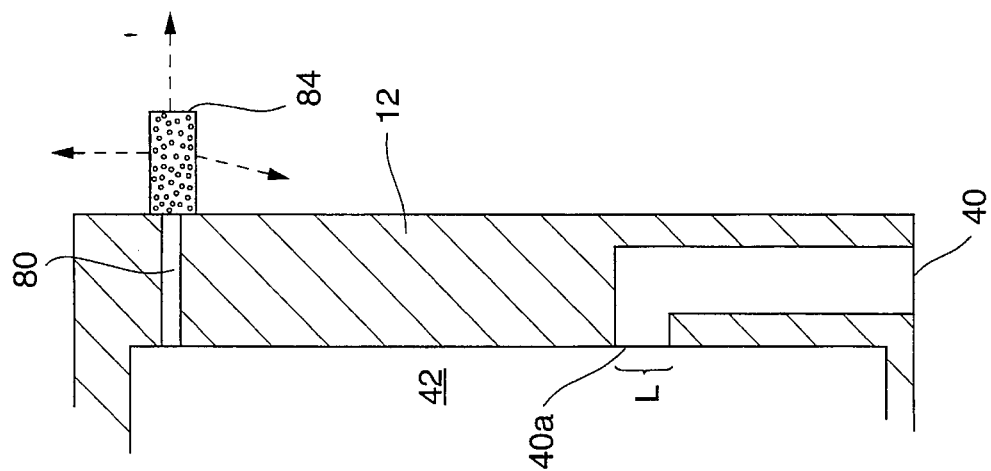
FIG. 7(A–C) are cross-sectional views of other embodiments of an air bleed means for the piston area.
Figure 7B:
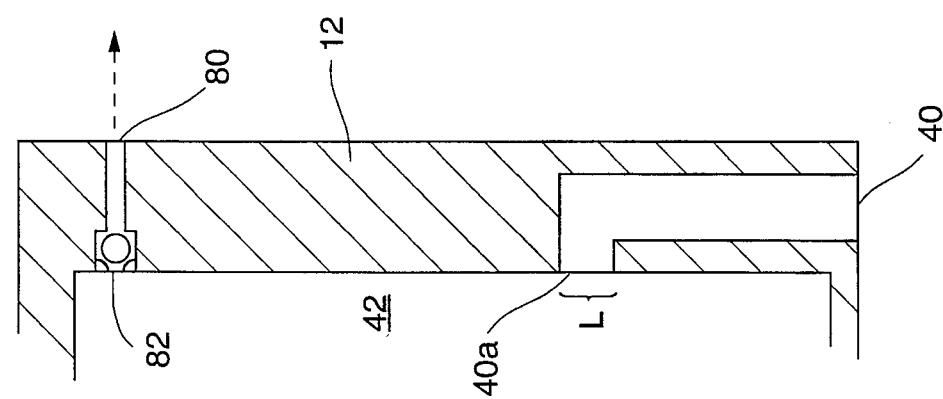
Figure 7A:
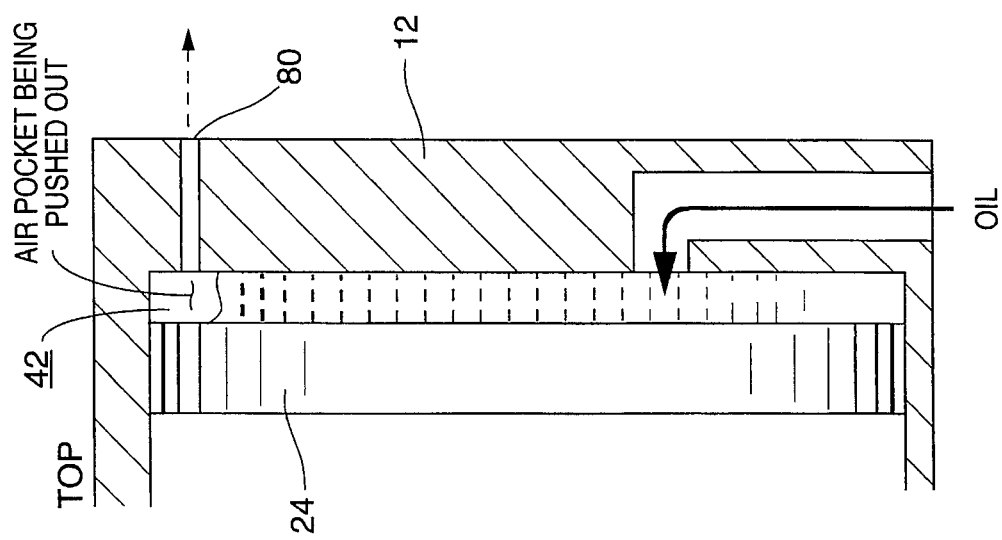

Referring to FIG. 7A there is shown the second passageway 80 positioned to bleed air from the space 42. The second passageway 80 is a passageway through the housing 12 but is separate and apart from the passageway 40 through which the transmission fluid is supplied to and removed from the space 42. Passageway 80 bleeds out any air in space 42, and also allows small amounts of oil to continually bleed out of space 42 when no air is present.

Referring to FIG. 7B there is shown another embodiment of the automatic transmission 10 with an air bleed valve 82. The air bleed valve 82 within the passageway 80 consists of a ball valve that permits air to be removed from the space 42 but prohibits more viscus fluid such as transmission fluid from being removed from the space 42.

Referring to FIG. 7C there is shown another embodiment of the air bleed valve. In this embodiment, the second passageway 80 is connected at one end to the space 42 and another end to an oil/air separator 84. The oil air separator 84 removes oil and air from the space 42 but it separates them so that air may be removed via one path while the separated oil is removed along a second path.

Figure 8:
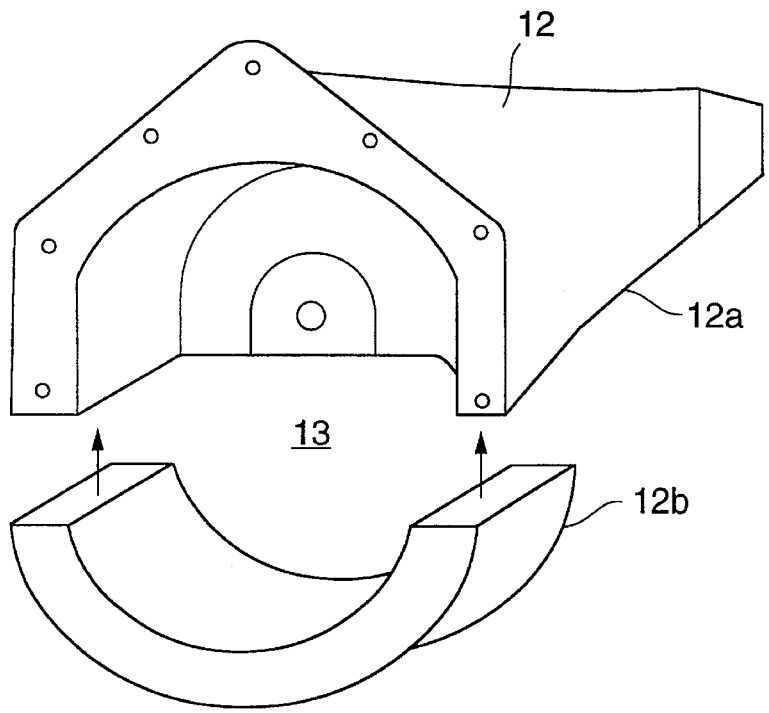
FIG. 8 is a perspective view of the automatic transmission of the present invention showing a top portion of a housing with a removable bottom section.
Figure 9:
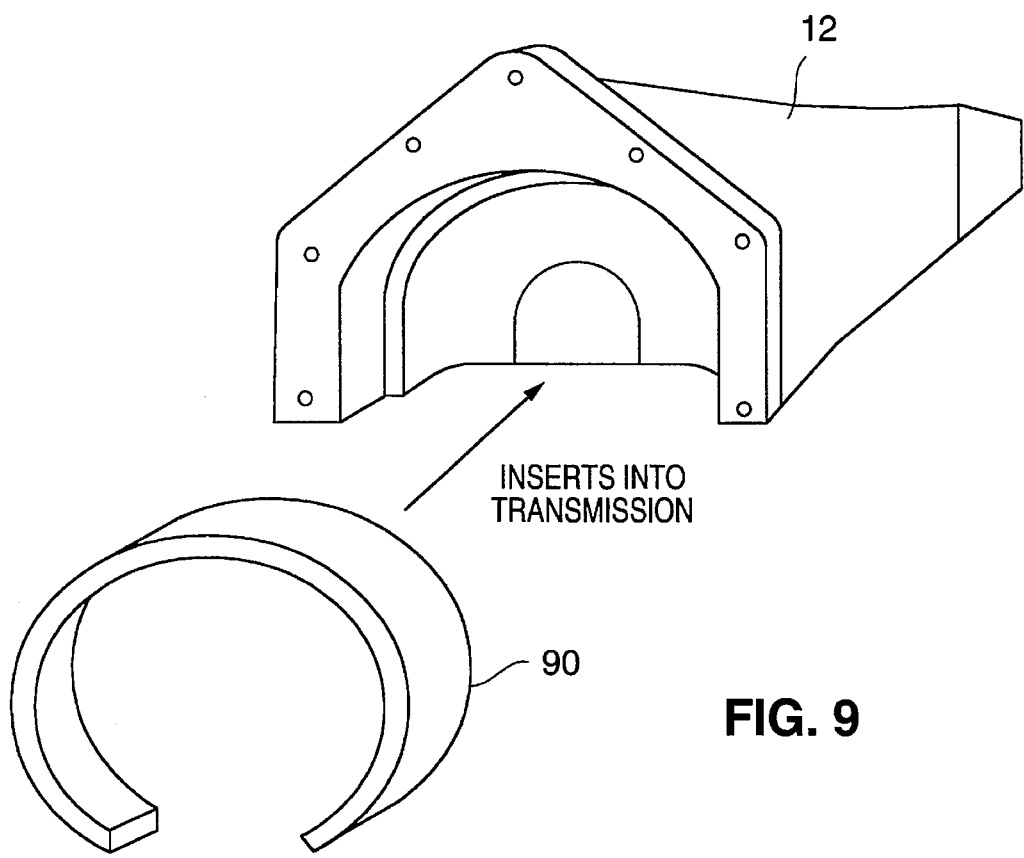
FIG. 9 is a perspective view of the automatic transmission of the present invention showing the housing with an insert to strengthen the transmission housing.

Referring to FIG. 8 there is shown a perspective view of an improved housing 12 for the automatic transmission 10 of the present invention. The housing 12 comprises an upper section 12a and a lower removably detachable section 12b. Upper and lower sections 12a and 12b are made of explosion resistant materials and/or are thicker than standard transmission housings to withstand explosions from a failing flexplate. Alternately, each of the upper section 12a and the lower section 12b or both can accept an explosion resistant liner 90 (shown in FIG. 9) made out of steel, composite, titanium, or aluminum, covering the flexplate portion 13. These materials are known to be explosion resistant and can be used to form a liner 90 which is inserted in the automatic transmission 10 between the external housing and the internal components. In yet another embodiment, the liner 90 may be a single piece circular liner completely lining the flexplate area portion 13 of the housing 12, as shown in FIG. 10.

Finally, referring to FIG. 11, there is shown a cross-sectional view of the flexplate portion 13 of the housing 12 of the transmission 10. The flexplate portion 13 of the housing 12 is made of a thicker material than the rest of the portion of the transmission housing 12. This again is to reinforce the flexplate portion of the housing 12 to withstand explosion.

It is to be understood that the present invention is not limited to the embodiments described above and illustrated herein, but encompasses any and all variations falling within the scope of the appended claims.

What is claimed is:

1. An automatic transmission comprising:

a transmission housing;

a reverse gear piston in said housing movable in a first direction, said piston having a surface;

hydraulic means for supplying hydraulic fluid to a space between the surface and said housing to engage said piston, and for removing said hydraulic fluid from said space to disengage said piston; and said hydraulic means include a passageway with a first portion having a substantially constant first cross-sectional area through said housing linked in a serial fashion with a second portion having a second cross-sectional area in said housing, said second portion is exposed to said space and said second cross-sectional area is greater than said first cross-sectional area.

2. The transmission of claim 1 wherein said first cross-sectional area is in the shape of a circle and said second cross-sectional area is in the shape of a slot.

3. The transmission of claim 2 wherein said passageway having curved edges through said housing.

4. The transmission of claim 1 wherein the transmission housing comprises:

a bell housing section surrounding a top half of the transmission housing made of an explosion resistant material.

5. The transmission of claim 4 wherein the explosion resistant material is made from a material consisting of steel, composite, titanium or aluminum.

6. The transmission of claim 1 wherein the transmission housing comprises:

a bell housing section surrounding the entire transmission housing made of an explosion resistant material.

7. The transmission of claim 6 wherein a bottom half of the bell housing section is a removable section.

8. The transmission of claim 1 further comprising means for removing air from said space through said housing.

9. The transmission of claim 8 wherein said removing means further comprising:

a second passageway from said space through said housing; and a bleed valve in said second passageway.

10. An automatic transmission comprising:

a transmission housing;

a reverse gear piston in said housing movable in a first direction, said piston having a surface;

hydraulic means for supplying hydraulic fluid through a passageway in said housing to a space between the surface and said housing to engage said piston, and for removing said hydraulic fluid from said space to disengage said piston;

said hydraulic means include said passageway with a first portion having a substantially constant first cross-sectional area through said housing linked in a serial fashion with a second portion having a second cross-sectional area in said housing, said second portion is exposed to said space and said second cross-sectional area is greater than said first cross-sectional area; and means for adjusting the first cross-sectional area of said passageway through said housing.

11. The transmission of claim 10 wherein said adjusting means comprises an adjustable needle valve.

12. The transmission of claim 10 wherein said adjusting means comprises an adjustable blocking bolt.

13. The transmission of claim 10 wherein said adjusting means comprises a flow restricting sleeve positioned in said passageway in said housing.

14. The transmission of claim 10 further comprising means for removing air from said space through said housing.

15. The transmission of claim 14 wherein said removing means further comprising:

a second passageway from said space through said housing; and a bleed valve in said second passageway.

16. The transmission of claim 10 wherein the transmission housing comprises:

a bell housing section surrounding a top half of the transmission housing made of an explosion resistant material.

17. The transmission of claim 16 wherein the explosion resistant material is made from a material consisting of steel, composite, titanium or aluminum.

18. The transmission of claim 10 wherein the transmission housing comprises:

a bell housing section surrounding the entire transmission housing made of an explosion resistant material.

19. The transmission of claim 18 wherein a bottom half of the bell housing section is a removable section.

20. The transmission of claim 10 wherein said second portion is substantially perpendicular to the first portion.

21. The transmission of claim 20 wherein said second portion is substantially perpendicular to the surface.

* * * * *